United States Patent [19]

Schnabel et al.

[11] Patent Number: 4,780,369

[45] Date of Patent: Oct. 25, 1988

[54] POROUS GLASS MEMBRANE TUBES

[75] Inventors: Roland Schnabel, Hofheim; Alexander Holzel, Mainz-Finthen; Kurt Gotter, Mainz, all of Fed. Rep. of Germany

[73] Assignee: Jenaer Glaswerk, Schott & Gen., Mainz, Fed. Rep. of Germany

[21] Appl. No.: 599,594

[22] Filed: Apr. 12, 1984

Related U.S. Application Data

[63] Continuation of Ser. No. 389,211, May 12, 1982, abandoned, which is a continuation of Ser. No. 37,373, May 9, 1979, abandoned, which is a continuation of Ser. No. 792,050, Apr. 28, 1977, abandoned, which is a continuation of Ser. No. 631,471, Nov. 13, 1975, Pat. No. 4,042,359.

[51] Int. Cl.$^4$ .................. B32B 9/00; B01D 39/00; B01D 39/08
[52] U.S. Cl. .................................... 428/398; 65/30.1; 65/31; 428/391; 428/392; 428/36; 210/500.23; 210/500.24; 210/506; 210/509
[58] Field of Search .............. 428/375, 376, 378, 388, 428/391, 392, 398, 36; 65/30 R, 31, 30.1; 210/3.41, 500.1, 506, 509, 321 R, 500.23, 500.24

[56] References Cited

U.S. PATENT DOCUMENTS

| | | | |
|---|---|---|---|
| 2,531,571 | 11/1950 | Hyde | 428/391 |
| 2,965,925 | 12/1960 | Dietzsch, Sr. | 428/398 X |
| 3,485,687 | 12/1969 | Chapman | 65/31 X |
| 3,498,826 | 3/1970 | Coroselli et al. | 428/383 X |
| 3,498,909 | 3/1970 | Littman | 210/321 R X |
| 3,692,186 | 9/1972 | Marzocchi | 65/31 X |
| 3,904,422 | 9/1975 | Eaton | 65/31 X |
| 3,956,179 | 5/1976 | Sebastian et al. | 252/430 |

*Primary Examiner*—Lorraine T. Kendell

[57] ABSTRACT

The invention relates to a process for producing a tubular glass membrane with wall thicknesses between 5 and 30 microns and reproducible pore sizes between 11 A and 50 A. Alkali borosilicate glass is drawn into discrete hollow tubes and immediately cooled. The tubes are thermally treated to effect a phase separation into a coherent silicon dioxide phase and a boron oxide phase rich in alkali borate. The boron oxide phase is leached out with mineral acid. The tubes can be subsequently treated to give enlarged or reduced pores, asymmetric pores and coated surfaces.

14 Claims, 3 Drawing Sheets

POROUS GLASS MEMBRANE TUBES

CROSS REFERENCE TO RELATED APPLICATION

This application is a continuation of U.S. application Ser. No. 389,211, filed May 18, 1982, and now abandoned; which is a continuation of U.S. application Ser. No. 37,373, filed May 9, 1979, and now abandoned; which is a continuation of U.S. application Ser. No. 792,050, filed Apr. 28, 1977, and now abandoned; which is a continuation of U.S. application Ser. No. 631,471, filed Nov. 13, 1975, now U.S. Pat. No. 4,042,359.

The present invention relates to porous glass membranes, processes for the production thereof and also the special treatment of such membranes, which makes technologically possible their efficient use in separation problems. For example, use of porous glass tubes in salt extraction and ultrafiltration, use as a physiological membrane or ion exchanger membrane and other similar uses.

At the present time, without prejudice to a general utility, a large number of specific synthetic plastics membranes, restricted in their range of variation and consisting of different basic material, such as cellulose acetate or polyamide, are available for solving the manifold and extremely different problems which arise in use. The size of the pores of these materials can be adjusted by suitable treatments. By increasing the degree of cross-linking, these membranes can be mechanically stabilized but a reduced permeability results. They can be adapted within a limited range to a separation problem by treatment with special chemicals, as for example polysulphonic acids.

Disadvantages of the known synthetic plastics membranes are the restricted possibility of application, the lack of resistance to different solvents and to biological or enzymatic attack, and also the relatively low mechanical resistance, despite a higher degree of crosslinking. Under increased pressure and also with a change of the solvent, the pore structure of the membrane is altered. The compression effect and the shrinkage or swelling which are caused thereby are known and are described in a large number of publications. It can be stated generally that the use of a synthetic plastics membrane for a specific use always constitutes a compromise and can only in a few limited cases be considered as a perfect solution of the problem.

Membrane-like bodies consisting of porous glass have also already become known. The basic glass which is generally used for the purpose and which also serves as starting material for the present invention is described in U.S. Pat. Nos. 2,106,744, 2,215,039, 2,286,275 and 2,221,709. This glass, which consists of silicon dioxide, boric acid and alkali oxide, presents a miscibility gap for a certain composition range in the phase diagram; i.e. under certain time and temperature conditions, the glass is separated or split up into two phases, one of the phases consisting substantially of silicon dioxide which is insoluble in mineral acid, while the other phase represents a soluble coherent boric acid phase rich in alkali borate. If the boric acid phase is dissolved out of this heterogeneous glass structure by means of a mineral acid, there is left a porous skeleton of substantially insoluble silicon dioxide. The specifications in these references are incorporated herein by reference.

It is known that the production of porous glass bodies involves serious difficulties if a high reproducibility of the porous structure is required for the use of such glass bodies as membranes. The problem is that the porous glass bodies produced from definite melts by definite tempering and extraction and their pore size and the pore volume cannot or can only be insufficiently accurately adjusted when employing relatively large batches. For this reason, it has so far still not been possible successfully to use porous glass for separation problems on an industrial scale.

It is true that U.S. Pat. No. 3,498,909 describes an apparatus for extracting salt from water, in which elongated capillaries of porous glass are used as membranes, but it is not possible to derive any information from this patent specification as to how these membranes should be manufactured.

The dimensions of 0.5 mm to 2.5 mm external diameter of the capillaries, as indicated in the patent claims, and the constructional example which is shown in the drawings and for which capillaries having an external diameter of 1.5 mm are to be used, show that smaller dimensions of the capillaries are considered to be technologically not suitable. On the other hand, however, it is known that the capacity and thus also the economic viability depends on the membrane surface which offers the smallest volume and the smallest membrane thickness. The production of such hollow fiber is also the subject of the present invention.

U.S. Pat. No. 3,600,147 describes a process for the production of semipermeable membranes from glass. The film-like membranes which are produced by this process already show per se a relatively small thickness, but must be carried by a porous support material. However, even a membrane carried by a large-pore support material does not withstand any pressure loading of up to 250 at., such as is required for example for a membrane used for salt-extraction processes.

Subsequent investigations have shown (Kraus et al., Science Vol. 151 (1966), page 194; V. Ballou et al., Environmental Science and Technology, 5 (1971), pages 1032–1038; V. Ballou et al., Journal of Colloid and Interface Science, 41 (1972), 198–207) that the membranes of porous glass manufactured by the known processes have not provided any decisive technical advance, since it has been possible to produce only low through-flow rates, because of insufficient reproducibility and also a too large membrane thickness. When these membranes are used in salt-extraction installations only a small degree of salt-extraction was accomplished.

Even if it would have been possible hitherto to produce a sufficiently rigid and thin glass membrane having a pore distribution capable of being reproduced, the general use of such membranes would be restricted by the fact that the basic substance of silicon dioxide would not in all fields of application have a sufficiently long life.

The object of the present invention is therefore the production of a sufficiently thin-walled, rigid, and resistant membrane from a glass in which it is possible to produce a pore distribution capable of being reproduced and of which the frame substance forming the membrane consists of a substantially insoluble material, which glass can be economically employed, is variable as regards the pore size by special treatment and can be so treated for specific uses that the membrane shows a sufficiently long life.

The invention may be better understood by reference to the following drawings wherein.

This object is achieved by glass membranes consisting of porous glass. Porous glass can be produced by a melt of a sodium borosilicate glass as known per se, with 53 to 72% by weig of $SiO_2$, 20 to 35% by weight of $B_2O_3$ and alkali metal oxide equivalent to to 12% by weight of $Na_2O$, being directly drawn into endless, thin-walled glass bodies, advantageously hollow fibers, these glass bodies being subjected to a thermal treatment in order to cause in the said bodies a phase separation into a substantially insoluble silicon dioxide phase and a boric acid phase rich in sodium borate, which is soluble in mineral acid; these thermally treated glass bodies being treated with mineral acids in order to dissolve out the boric acid phase rich in sodium borate, whereby a porous glass membrane of substantially difficulty soluble $SiO_2$ is formed.

The initial glass, to which small amounts of aluminum oxide can be added for better working, is melted between 1300° C. and 1400° C. and drawn or pulled at a viscosity of advantageously $10^3$ Poises to thin-walled bodies, preferably hollow fibers.

The principle of drawing or pulling of hollow fibers is already known from U.S. Pat. No. 3,510,393; nevertheless, in said patent, continuous fiber lengths are pulled, the walls of the separate filaments touching and being connected to one another.

On the other hand, when hollow fibers are produced according to the present invention, the walls of the separate fibers must be free, since they subsequently constitute the actual membranes. This effect is achieved by cooling devices which are arranged directly beneath the nozzle and the dimensions and spacing from the drawing nozzle establish the later dimensions of the hollow fibers. The direct cooling of the endless glass bodies pulled from the melt and after leaving the drawing nozzle is also necessary, so that the external form and the inner structure of the glass bodies is fixed. The fixing of the structure also has an advantageous effect on the thermal threatment which is to follow later. In this way a phase separation is produced which is as uniform as possible and can be reproduced and hence there is also a uniform and reproducible pore structure. If glass bodies for membranes are not produced directly from the melt, but in a redrawing method from glass tubes or other glass objects, the thermal treatments and structural changes which are connected therewith have a disadvantageous effect on the result of the subsequent pore distribution. The pulling of glass bodies directly from the melt has the additional advantage that optimal strength properties can be produced for the membranes having very thin walls.

As regards the thermal treatment, it has been shown that the chemical separation of phase separation is advantageously to be carried out over long time periods, of about 3 to 100 hours, depending on thickness of the membrane, since only then does the pore distribution become homogeneous. In the initial state of the separation the phase separation is highly dependent on the local temperature distribution in the glass.

The following extraction of the segregated phase is effected with mineral acid, for example, saturated with potassium chloride, at elevated temperature, advantageously between 80° C. and 100° C.

Care must be taken that the membrane bodies do not touch one another during the extraction and that the extraction bath has a homogeneous temperature distribution. With locally different temperatures and due to the different extraction which is the result thereof, stresses can occur in the glass, which lead to the destruction of the membrane bodies.

The initial pore size of the extracted glass membrane bodies is advantageously between 11 and 50 A, and by careful thermal pretreatment by the process in accordance with the invention, the pore distribution can be kept within an extremely small range of about ±2 A.

The glass composition is in the ternary system $R_2O$—$B_2O_3$—$SiO_2$ where $R_2O$ is the alkali metal oxide $Na_2O$ or $K_2O$. The percentage of weight of $R_2O$ can be between 4–12% and is preferably between 5–8% and is dependent on the quantity of $SiO_2$ employed and any other constituent such as $Al_2O_3$ or $Sb_2O_3$. $Al_2O_3$ is added for ease in handling. The amount of $B_2O_3$ is 20–35% by weight and the $SiO_2$ is generally 53 to 72% by weight. See U.S. Pat. No. 2,286,275 for a discussion of the dependencies in the ternary system.

In asymmetrical enlargement with sodium hydroxide the concentration of the sodium hydroxide is about 0.5N and is used at a temperature between −15° C. and 60° C., which allows for balancing time length, temperature and concentration to achieve the desired pore size.

In shrinking the pore sizes a diameter reduced by a factor of 10 was effected by heating at 730° C. for 4 hours.

The heat treatment for effecting the phase separation is done at 500° C. to 650° C. for a total of 5 minutes to 50 hours.

It is preferred to carry out the separation over time intervals between 3 and 100 hours. A preferred treatment is 16 hours at 595°±1° C.

The extraction following the heat treatment can be effected with any mineral acids such as hydrochloric, sulfuric, nitric, phosphoric. The acids may be used in conjunction with salts. Hydrochloric acid is preferred and can be used with KCl.

Glass membranes having the indicated pore characteristics are ready in this state to be used for various purposes. In most cases, however, it will be necessary for the pore size to be further modified in another processing step. The statistical size distribution of the initial pores produced by the process of the invention shows only a small deviation. This is also of decisive importance with respect to any further modification of pore sizes.

The subsequent enlargement of the pores can be achieved by the silicon dioxide structure being partially dissolved out with a strong alkali solvent. Sodium hydroxide is generally the alkali used. Using the process of the invention, it is possible in this way to produce pores up to diameters of 1000 A with an extremely sharp front flank in steps of 11 A. A particular aspect of the process according to the invention is the production of membrane bodies from porous glass with asymmetrical pore distribution. By asymmetrical pore distribution in this connection is not meant any sudden change from one pore size to another, such as can be achieved with membrane bodies which are composed of several layers of different pore size, but a gradient of the pore size which is steadily altered through the thickness of the membrane. Such membranes have the decisive advantage that the active separating layer can be kept almost as thin as desired, independently of the per se already small thickness of the membrane body, and hence the permeation efficiency can be considerably increased, since the coarse sub-structure is mechanically stable and, in relation to the small surface pore diameters, does not offer any substantial resistance to the liquid passing through.

Such an asymmetrical pore distribution is produced according to the invention by having the solvent with which the silicon dioxide structure is partially dissolved out only in contact with one side of the membrane surface. Or, for specified conditions, the other side of the membrane surface can be flushed by a neutralizing solution. This is a process by which any desired membrane thicknesses can be obtained.

The diameters of the pores in a porous silicon dioxide glass obtained by dissolving out the boric acid phase containing sodium borate can however not only be enlarged, but also reduced in size. It is known that such a porous glass with a high silicon dioxide content can be shrunk again into a compact glass mass by a subsequent heat treatment at about 1100° C. The purpose of this known process was to obtain a glass of which the initial materials are per se difficult to melt. Such a glass which is similar to quartz is known under the trade name "Vycor" glass. This shrinking property of a porous glass based on silicon dioxide at high temperatures is utilized in accordance with the invention for intentionally modifying the pore structure. In this invention, however, a lower temperature of about 700° to 800° C. is used. It has been found that it is possible in this way to carry out a controllable shrinkage process which can be stopped in any intermediate stage. In the temperature range according to the invention below 800° C., the pores are uniformly shrunk over their entire length, whereas at temperatures above 800° C., the pores are mainly constricted at the surface, and this is unsuitable for the formation of a membrane.

Using the shrinkage process, can also give asymmetric pore distributions by having a temperature influence on one side and it is advantageous to use a starting material of homogeneous pore diameters of about 300 A. In the manner as described, it is possible to produce pores with diameters down to less than 5 A, so that the range of application of such membranes can be substantially broadened by the process of the invention.

Since, with equal time units, the function of pore diameter relative to the temperature shows a very steep rise, it is sufficient for the production of asymmetrical membranes in the temperature range from 720° to 800° C. to have a temperature difference of 10° to 50° C. between the membrane surfaces, in order to cause a one-sided shrinkage process and thus the formation of asymmetrical membranes. The range can, of course, be greater, as 10° to 100° C.

In accordance with the invention, the processing steps for enlarging or reducing the size of the pores can also be combined in suitable manner. By way of example, the possibility exists of the pores being uniformly shrunk to a required diameter, in order thereafter to enlarge them on one side in an asymmetrical manner.

By using the processes as previously described, the pore structure of a porous glass membrane can be adapted in best possible manner to the problem involved in the use thereof. As a consequence, the glass membrane according to the invention constitutes a substantial improvement by comparison with the prior known synthetic plastics membranes which are only suitable for an individualized use.

In asymmetric pores the active layer has been indicated as the layer having the smaller pore size, which becomes increasingly larger through the membrane.

As stated, another object of the invention is to increase the hitherto unsatisfactory life of the membranes which is caused by gradual dissolving of the silicon dioxide and at the same time to improve the specific selectivity with unreduced permeation efficiency.

Known technologies for improving the surfaces of glass in general consist either in the application of a film of polymeric material which in itself is relatively stable or in the conversion of the silanol groups to hydrophobic silanes. Both methods are unsuitable for use in the technology concerned with membranes.

It is difficult to achieve a conversion to an hydrolysis-stable, hydrophilic compound with the silanol group restricted in that only one side of the organic compound may react and a polymerization has to be avoided.

Several advantages would be achieved by such a modification:

(a) The organic molecules stand in the form of bristles in the flow passage, which favors the radial mass transport, so that a surface of increased efficiency is obtained.
(b) The molecules improve the diffusion processes by an apparent reduction in size of the flow passage.
(c) The throughflow rate for water is increased by the advantageously hydrophilic group. In tests, a four-fold improvement as compared with unmodified porous glass membranes was obtained.
(d) By reaction of the glass surface with correspondingly combined molecules, e.g. a branched dialkyl halosilane with subsequent reaction to the functional group, it is possible to obtain an effective surface protection, so that there is no dissolving of $SiO_2$. The active life of the membrane could in simulated tests be increased three-fold.

German Offenlegungsschrift No. 2,313,073 describes how it is possible for glass surfaces in general to be treated by direct chemical reaction of the reactive silanol groups with organic molecules. The use and further development of this method in respect of special problems concerned with membrane technology represents one possible step in the process according to the invention.

In accordance with the last-mentioned method, the organic molecules, with which the silanol groups of the pore surfaces of the glass membranes in accordance with the invention are reacted, have functional groups, such as hydroxyl, amino, nitro, sulphonic acid, carbonyl, carboxyl and nitrilo groups on the unreacted end. The choice of the group depends on the electronegative condition which is best adapted to the case of application or the intended $+I$ or $-I$ effect. The effect can be increased if several functional groups are introduced for a reacted silanol group or also if, for example, a secondary or tertiary amine or even a quaternary ammonium salt is introduced instead of a primary amine.

The reaction of the silanol group with an organic molecule such as dibutyl dichlorosilane, $Cl_2Si(C_4H_8Cl)_2$ or $Cl_2Si(C_4H_8SO_2Cl)_2$ forms an Si—C bond. This protects the surface of the glass tube against the action of water sterically by the present of hydrophobic side chains. These terminal groups of the organic molecule contain halogen atoms which can be treated with other reagents to effect other terminal groups. Treatment with sodium sulfite groups introduces —NaSO$_3$. Similarly the silane treated fiber can be brominated or halogenated. The resultant fiber can be treated with ethylene diamine, or N,N-dimethyl ethylene diamine. Subsequent reactions can introduce terminal —SH groups which can be oxidized to SO$_3$H groups. Similarly other functional groups can be introduced.

The exact formation of a membrane produced by the process of the invention depends on the purpose for which it is to be subsequently used, but hollow fiber membranes have proved to be most desirable for most applications. Such hollow fiber membranes are advantageously produced with internal diameters between 30 microns and 80 microns. The thickness of the membrane material is advantageously 5 microns to 30 microns. An additional advantage of the hollow fiber membranes consists in that they are sufficiently resistant to the pressures which are necesssary for many processes in which they are employed. Moreover, the glass tubes are self-supporting and do not require a support membrane.

EXAMPLES OF APPLICATION

Example 1

Production of a salt-extraction membrane in the form of a hollow fiber with a degree of salt extraction, related to 0.5% NaCl solution, of 70% and a throughflow rate of 6 l/m$^2$h 3 kg of a batch or mixture consisting of 68% by weight of SiO$_2$, 26% by weight of B$_2$O$_3$ and 6% by weight of Na$_2$O, with an addition of 0.2% of Sb$_2$O$_3$, are melted at 1500° C. in a drawing crucible consisting of platinum, until the melt is free from bubbles.

The glass leaves the crucible at a viscosity of 10$^3$ Poises through a drawing or pulling nozzle over a hollow needle in the form of a tube having a shape corresponding to the dimensions of the said nozzle. The glass is drawn at a speed of 625 m/min through an annular cooling arrangement, so that the glass structure and the geometrical dimension of the hollow fiber is maintained. The dimensions which are obtained are 80 microns as regards external diameter and 50 microns as regards internal diameter.

The group of hollow fibers wound on to a drum is heated to effect chemical separation for 16 hours in a tempering furnace kept at 595±1° C.

Figure 1:
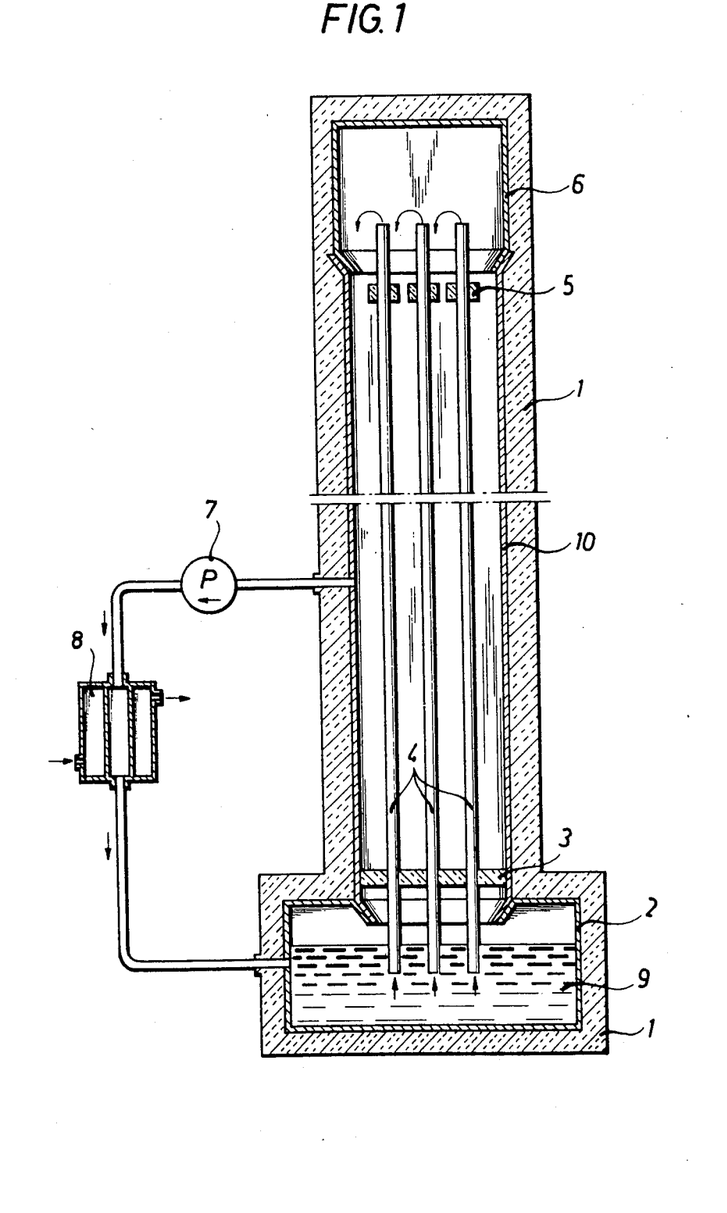
FIG. 1 is a sectional view of one embodiment of an apparatus suitable for practicing the process of the present invention.

After the separation operation, the hollow fibers are extracted for 4 hours in a mixture of 10 liters of H$_2$O, 4 liters of concentrated HCl and 4.4 kg of KCl at 90° C. The apparatus used for this purpose is shown in FIG. 1.

From a thermostatically controlled storage container 2, the liquid 9 is guided by means of a circulating pump 7 along the inside wall and the outside wall of the hollow fibers 4 and, after a heat exchanger 8 has balanced out the possibly occurring temperature fluctuations, is returned into the storage container 2. The entire vessel is enclosed by a heating and insulating casing 1 which is adjustable as regards temperature.

The container 10 for receiving the hollow fibers is closed off from the supply container 2 by means of an insulating mass 3 and is provided with a cover hood 6.

The hollow fibers are fixed by the insulating mass 3 and the holding means 5, which both consist of a material resistant to mineral acid, and preferably of a waterglass adhesive.

The acid mixture is discharged and the remaining, now already porous hollow fibers are washed with water until neutral.

The remaining quantity of 2 kg of hollow fibers has the properties as indicated above.

The pore diameters are in the region of 26±2 A.

Example 2

Production of an asymmetrical salt-extraction membrane in the form of a hollow fiber with a degree of salt extraction of 70%, with improved permeationn efficiency according to Example 1

Figure 2:
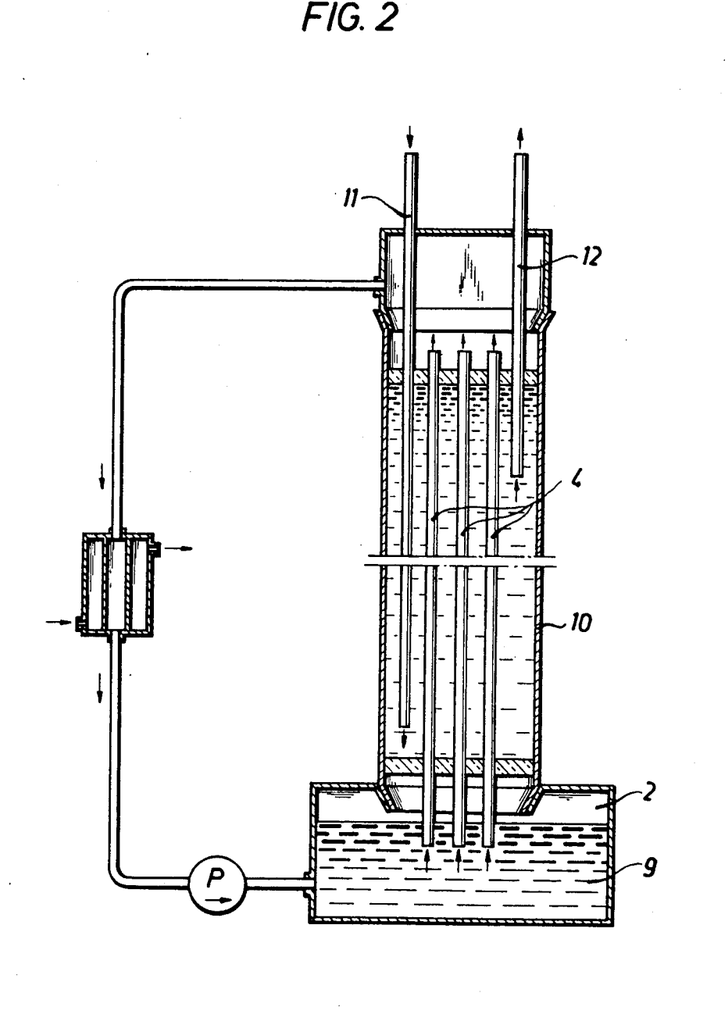
FIG. 2 is a sectional view of another embodiment of an apparatus also suitable for practicing the process of the present invention.

For this purpose, the porous hollow fiber obtained according to Example 1 is flushed from inside with a 0.5N—NaOH solution at ±5° C. Used for this purpose is the apparatus which is shown in FIG. 2.

A liquid 9 which attacks the membrane structure, advantageously a strong caustic solution such as sodium hydroxide solution, is drawn through the hollow fibers 4 from the storage vessel 2. The external walls of the hollow fibers are flushed with acid, which passes through the supply tube 11 into the receiving container 10 and is drawn off through the discharge tube 12. A temperature between −15° C. and 60° C. is used in this operation, so that the action of the sodium hydroxide solution can be regulated over the time period and the temperature can be regulated in a defined manner. By comparison with membranes having a constant pore diameter, membranes with an asymmetrical pore distribution show a substantially higher permeability, without the retaining power relative to salt ions being impaired, since this only depends on the boundary layer between salt solution and membrane surface.

By SiO$_2$ being dissolved out of the pores, these pores are enlarged. In order to avoid the dissolving of SiO$_2$ near the membrane surface on the pressure side, this part is kept acid with 0.1N—HCl. After 3 hours, the hollow fibers are flushed from inside with water, and the 0.1N—HCl is replaced by water. The active layer is on the outside of the membrane.

Example 3

Production of an asymmetrical salt-extraction membrane in the form of a hollow fiber with a degree of salt extraction of 70% with increased permeation power according to Example 1

In this case, the procedure is according to Example 2, with the difference that the acid flows in the hollow fibers and the caustic solution enlarges the pores from outside. The active layer is accordingly disposed on the inside wall of the hollow fibers.

Example 4

Production of an ultrafiltration membrane in the form of a hollow fiber

For this purpose, 1 kg of porous hollow fibers obtained according to Example 1 are treated at 0° C. for 24 hours with 10 liters of 0.5N—NaOH. The pores are in this way increased in size from a diameter of 26 A to a maximum diameter of 164 A. The apparatus being used is shown in FIG. 1 and is described in Example 1.

Figure 3:
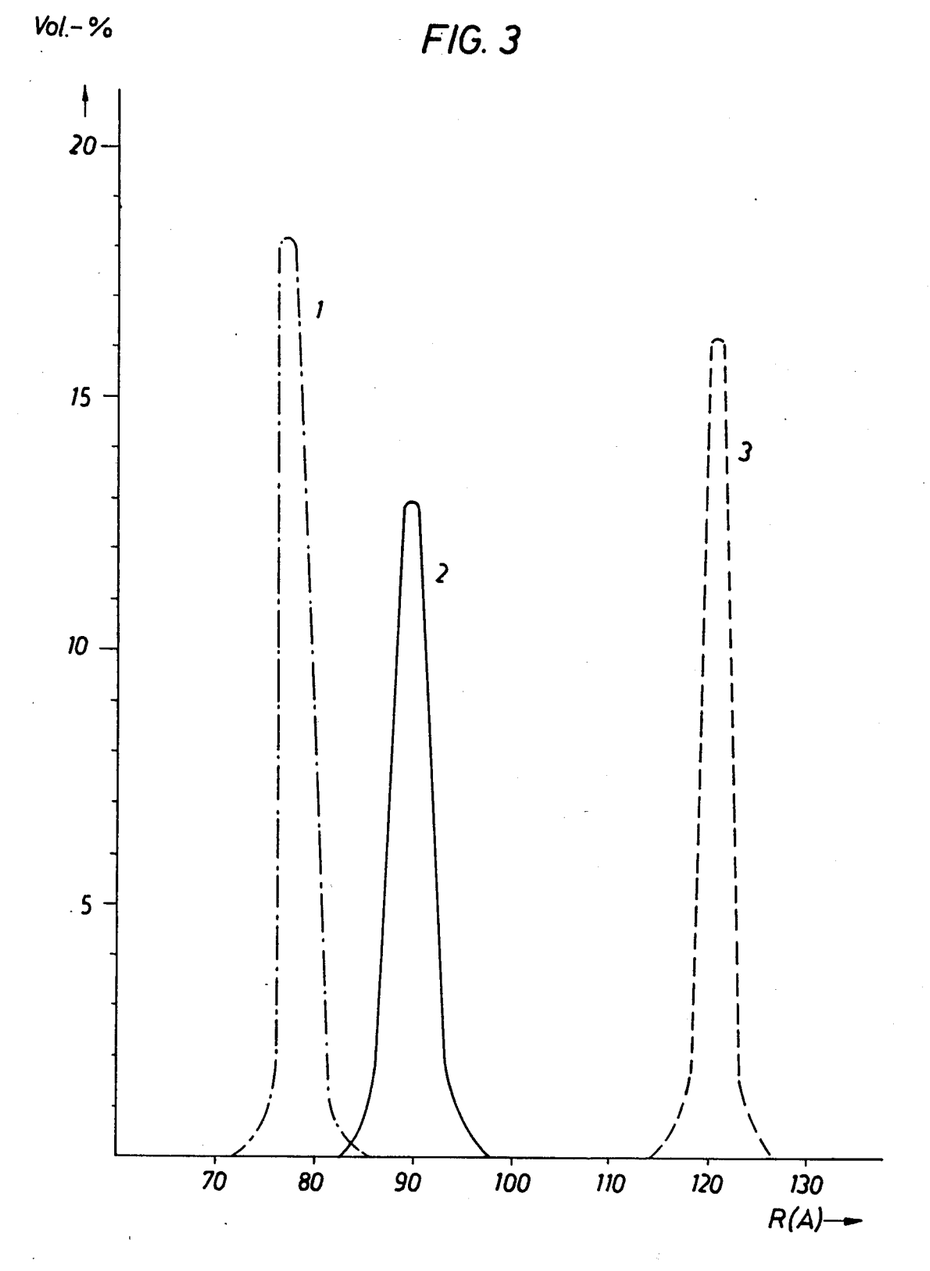
FIG. 3 is a graph illustrating certain test results.

FIG. 3 represents pore distributions which were recorded with the mercury pressure porosimeter.

Curve 1 corresponds to Example 4.

Curve 2 was obtained after a treatment time of 48 hours and at 0° C. and Curve 3 after 96 hours and at 0° C.

Example 5

Production of an asymmetrical ultrafiltration membrane in the form of a hollow fiber with an increased throughflow in accordance with Example 4

In this case, the porous hollow fiber obtained according to Example 4 is treated with NaOH in accordance with Example 2.

Example 6

Production of an asymmetrical ultrafiltration membrane in the form of a hollow fiber with increased throughflow according to Example 4

In this case, the porous hollow fiber obtained according to Example 4 is treated with NaOH in accordance with Example 3.

Example 7

Production of membrane in the form of a hollow fiber with smaller pore diameters according to the membrane obtained in Example 1 by shrinkage For this purpose, the porous hollow fiber obtained according to Example 1 is shrunk for 4 hours at 730° C. Membranes are obtained having pores smaller than 5 Å and a greatly reduced throughflow of 0.62 l/m² h.

Example 8

Production of asymmetrical membranes in the form of hollow fibers by shrinkage

The procedure here was in accordance with Example 7. The hollow fiber was flushed through with air at a temperature of 670° C. The throughflow is 4.3 l/m² h.

Example 9

Production of asymmetrical membranes in the form of hollow fibers by shrinkage

For this purpose, the procedure according to Example 8 was followed. The outside wall of the hollow fiber ikept at 670° C., while the interior is flushed through with air at a temperature of 730° C. The throughflow is once again 4.3 l/m² h.

Example 10

Production of an asymmetrical membrane in the form of a hollow fiber by shrinkage For this purpose, an asymmetrical salt-extraction membrane produced according to Example 2 or an asymmetrical ultrafiltration membrane produced according to Example 5 was treated by a defined shrinkage in accordance with Example 7; the asymmetry of the membrane was maintained and the pore diameters were in total reduced by a corresponding factor.

The conditions required for producing a diameter reduced by the factor 10 were 730° C. and a treatment time of 4 hours.

Example 11

Production of an asymmetrical membrane in the form of a hollow fiber by shrinkage In this case, a hollow fiber membrane obtained according to Example 3 or 6 is treated as described in Example 7. The active layer is accordingly disposed on the internal wall of the hollow fiber.

Example 12

Production of an asymmetrical membrane by shrinkage and subsequent enlargement of the pores with an externally disposed active layer For this purpose, a salt-extraction membrane obtained according to Example 1 was shrunk in accordance with Example 7. The subsequent enlargement of the pores is effected asymmetrically in accordance with Example 2 or Example 5.

Example 13

Production of an asymmetrical membrane by shrinkage with internally disposed active layer For this purpose, a salt-extraction membrane obtained according to Example 1 was shrunk in accordance with Example 7. The subsequent enlargement of the pores is effected asymmetrically in accordance with Example 3 or Example 6.

Example 14

Production of a hydrophobic membrane in the form of a hollow fiber with Si—C bond For this purpose, porous hollow fibers obtained according to Examples 1 to 13 were dried at 120° C. under vacuum. For 100 g of hollow fibers, there is added a mixture of 54 g of dibutyl dichlorosilane, 20 g of pyridine and 500 ml of toluene and heating takes place for 8 hours to boiling point. Thereafter, the silanizing mixture is discharged and washing takes place with methylene chloride.

Example 15

Production of a cation exchanger membrane in the form of a hollow fiber with a terminal —NaSO$_3$ For this purpose, a hollow fiber obtained according to Example 14 is sulphochlorinated with Cl$_2$ and SO$_2$ with ultraviolet radiation (mercury lamp). The sulphochlorinated hollow fiber is hydrolyzed with 10% sodium sulphite solution at room temperature for 2 days, with formation of NaSO$_3$ groups.

Example 16

Production of a cation exchanger membrane in the form of a hollow fiber with terminal —NaSO$_3$ For this purpose, a hollow fiber obtained according to Examples 1 to 13 is reacted in accordance with Example 14 with 105 g of Cl$_2$Si (C$_4$H$_8$SO$_2$Cl)$_2$. The hydrolysis to —NaSO$_3$ is effected in accordance with Example 15.

Example 17

Production of a halogenated membrane in the form of a hollow fiber

For this purpose, 100 g of hollow fibers obtained according to Example 14 are brominated with 20 ml of bromine in 500 ml of CCl$_4$ with introduction of Cl$_2$ at 50° C. with the ultraviolet light of a mercury lamp for 90 minutes. CCl$_4$ is released, the product is washed several times with methylene chloride and dried in vacuum at 100° C.

Example 18

Production of a halogenated membrane in the form of a hollow fiber

For this purpose, a hollow fiber obtained according to Examples 1 to 13 is reacted in accordance with Example 14 with 75 g of $Cl_2Si(C_4H_8Cl)_2$.

Example 19

Production of an anion exchanger membrane in the form of a hollow fiber

For this purpose, hollow fibers produced according to Example 17 or 18 are kept for 2 days at 70° C. with 30 ml of ethylene diamine and 250 ml of dioxane; the solution is discharged and washing takes place several times with methanol, methanol-$H_2O$ 1:1, water, methanol and diethylether and drying takes place under vacuum at 120° C.

Primary amine groups are hereby formed.

Example 20

Production of a strong anion exchanger membrane in the form of a hollow fiber

The procedure according to Example 19 is followed in this case. Ethylene diamine is replaced by N,N-dimethyl ethylene diamine. The tertiary amine obtained therefrom is reacted with $CH_3I$ in acetonitrile under reflux for 8 hours. The product is washed with methanol.

Example 21

Production of a cation exchanger membrane in the form of a hollow fiber

For this purpose, 100 g of the hollow fibers obtained according to Example 17 or 18 have added thereto 30 ml of ethane dithiol, 30 ml of triethylamine and 250 ml of diethylether and boiled for 2 days under reflux. The product as obtained is washed and dried in accordance with Example 19. The terminal SH groups are now oxidized with 30 ml of $H_2O_2$ (30%) in 270 ml of glacial acetic acid into $SO_3H$ groups.

Example 22

Production of a cation exchanger membrane in the form of a hollow fiber

For this purpose, 100 g of the hollow fibers obtained according to Example 17 or 18 are heated with 40 g of taurine in 600 ml of dimethylsulphoxide for 3 days at 80° C. The product as obtained is washed and dried in accordance with Example 19.

Example 23

Productionn of a cation exchanger membrane in the form of a hollow fiber

For this purpose, 100 g of hollow fibers obtained according to Example 17 or 18 are heated with 50 g of sodium thiosulphate in 500 ml of 50% ethanol for 4 hours at 80° C. The solution is discharged and washing takes place with 50% ethanol. The "mixed" salt is decomposed for 4 hours with 50 ml of HCl, 200 ml of $H_2O$ and 250 ml of ethanol, the solution is discharged, washing takes place with 50% ethanol, followed by drying.

The oxidation to $SO_3H$ is effected according to Example 21.

Example 24

Production of a cation exchanger membrane in the form of a hollow fiber

For this purpose, 100 g of hollow fibers obtained according to Example 17 or 18 are heated with 30 g of KHS in 400 ml of 50% ethanol for 2 hours at 80° C. The soluton is discharged and the fibers are washed with 50% ethanol.

The oxidation to $SO_3H$ is effected in accordance with Example 21.

We claim:

1. A hollow, microporous, glass fiber useful as a membrane, characterized in that the surface of the pores of the fiber is modified by direct chemical bonding of an organic silane and further modified by the introduction of terminal functional groups, the basic structure of which is defined by the glass structure, the surface properties of the glass structure being defined by chemical molecules of different polarity which are tightly bound to the glass surface, wherein the polarity is determined by the nature of the functional groups of the chemical molecules and ranges from hydrophobic groups to hydrophilic groups.

2. The glass fiber of claim 1 wherein the basic structure of the capillaries is their porosity.

3. The glass fiber of claim 1 wherein the hydrophobic groups are alkyl groups.

4. The glass fiber of claim 1 wherein the hydrophilic groups are —$SO_3Na$.

5. The hollow, microporous, glass membrance of claim 1 suitable for use as a cation exchange membrane in which the terminal group has been oxidized to —$SO_3H$.

6. A hollow, microporous, glass fiber useful as a membrane characterized in that an organic silane selected from the group comprising dibutyldichlorosilane, $Cl_2Si(C_4H_3Cl)_2$ and $Cl_2Si(C_4H_3SO_2Cl)_2$ is tightly bound to the surface of the pores of the glass fiber.

7. A hollow, microporous, glass membrane in which the surface of the pores of which has organic silane groups chemically bonded to the silanol groups therein, the terminal end of the organic silane having been reacted to have a functional group selected from the group consisting of hydroxyl, amino, nitro, sulphonic acid, carbonyl, carbosyl, and nitrilo on the unreacted end.

8. The hollow, microporous, glass membrane of claim 7 in which the functional amino group is a primary, secondary, or tertiary amino group or a quaternary ammonium group.

9. A hollow, microporous, glass fiber useful as a membrane characterized in that the surface of the pores of the fiber is chemically bonded to an organo silane.

10. The hollow, microporous, glass fiber of claim 9 which has further been sulphochlorinated and hydrolyzed so that the organo silane bonded thereto has the terminal functional group —$NaSO_3$.

11. The hollow, microporous, glass fiber of claim 9 in which the terminal group on the organic silane is chlorine or bromine.

12. The hollow, microporous, glass fiber of claim 9 suitable for use as an anion exchange membrane in which the terminal group on the organic silane has been reacted to form a primary amine, secondary amine, or tertiary amine.

13. A hollow, microporous, glass fiber useful as a membrane, the fiber having an internal diameter between 30 and 80 microns and a wall thickness between 5 and 30 microns, the surface of the pores of the fiber having an organic silane selected from the group consisting of dibutyldichlorosilane, $Cl_2Si(C_4H_8Cl)_2$ and $Cl_2Si(C_4H_8SO_2Cl)_2$ bonded thereto, the surface of the pores further having been sulphochlorinated and hydrolyzed so that the organic silane bonded thereto has the terminal functional group $-NaSO_3$.

14. The glass fiber of claim 6 suitable for use as a cation exchange membrane, wherein the surface of the pores has further been reacted with taurine.

* * * * *